United States Patent
Kemeny et al.

(10) Patent No.: US 6,923,843 B1
(45) Date of Patent: Aug. 2, 2005

(54) METHOD FOR OXYGEN INJECTION IN METALLURGICAL PROCESS REQUIRING VARIABLE OXYGEN FEED RATE

(75) Inventors: Frank L. Kemeny, Lewiston, NY (US); Michael J. Strelbisky, Burlington (CA)

(73) Assignee: Nupro Corporation, Grand Island, NY (US)

( * ) Notice: Subject to any disclaimer, the term of this patent is extended or adjusted under 35 U.S.C. 154(b) by 0 days.

(21) Appl. No.: 10/292,354

(22) Filed: Nov. 12, 2002

Related U.S. Application Data

(60) Provisional application No. 60/337,870, filed on Nov. 13, 2001.

(51) Int. Cl.⁷ ................................................. C21C 5/32
(52) U.S. Cl. .......................................... 75/387; 266/83
(58) Field of Search ....................... 75/83, 387; 266/83

(56) References Cited

U.S. PATENT DOCUMENTS

| | | | |
|---|---|---|---|
| 2,855,293 A | 10/1958 | Savard et al. | |
| 3,594,155 A | 7/1971 | Ramachandran | |
| 3,649,246 A | 3/1972 | Fulton et al. | |
| 3,666,439 A | 5/1972 | Ramachrandran | |
| 3,706,549 A | 12/1972 | Knuppel et al. | |
| 4,651,976 A * | 3/1987 | Arima et al. | 266/44 |
| 5,885,323 A * | 3/1999 | Kim et al. | 75/387 |
| 5,897,684 A * | 4/1999 | Kim et al. | 75/387 |
| 6,004,504 A * | 12/1999 | Vallomy | 266/79 |
| 6,093,235 A * | 7/2000 | Reichel | 75/585 |
| 6,171,364 B1 * | 1/2001 | Sarma et al. | 75/382 |

* cited by examiner

*Primary Examiner*—Melvyn Andrews
(74) *Attorney, Agent, or Firm*—Howard J. Greenwald P.C.; John M. Hammond

(57) ABSTRACT

A method of processing molten metal by the injection of oxygen through a water cooled supersonic oxygen injection lance. In the first step of the process, oxygen is injected through the injection lance at an initial flowrate to the process which is the optimal flowrate for the lance tip design. Thereafter, at least one process variable relating to the required oxygen flowrate is continuously measured, and oxygen flowrate may be reduced. A second gas flowrate is admixed to the injection lance to maintain the optimal overall gas flowrate to the process while reducing the oxygen flowrate.

13 Claims, 1 Drawing Sheet

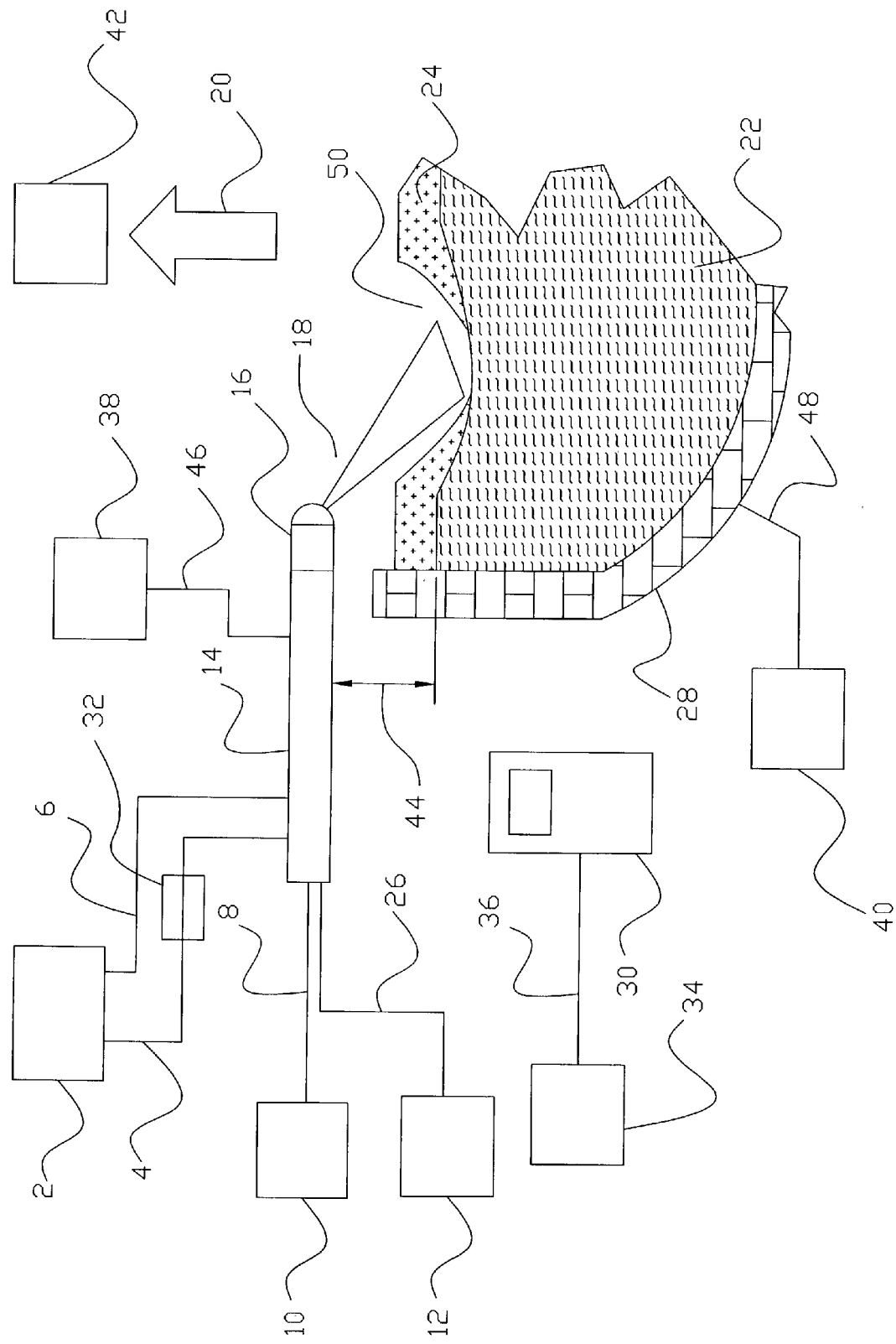

METHOD FOR OXYGEN INJECTION IN METALLURGICAL PROCESS REQUIRING VARIABLE OXYGEN FEED RATE

CROSS-REFERENCE TO RELATED PATENT APPLICATION

This application claims priority based upon applicants' provisional patent application 60/337,870, filed on Nov. 13, 2001.

FIELD OF THE INVENTION

This invention relates to the application of optimum flowrates of oxygen to a metallurgical process while maintaining optimal overall gas flowrate through a supersonic gas injection lance when such flowrates differ. Moreover, this invention provides the means for independently controlling the following parameters: 1) overall gas flowrate through the lance, 2) oxygen flowrate applied to the process, 3) height of the lance above the process bath, 4) depth of penetration of the gas jet into the bath, and 5) heat generation near the lance.

BACKGROUND OF THE INVENTION

The injection of oxygen for removal of impurities in metallurgical process is well known, for example U.S. Pat. No. 2,855,293 and U.S. Pat. No. 3,706,549. Also, several U.S. patents disclose ways of diluting the oxygen with another gas in order to minimize the amount of oxygen that reacts with the metal. Such patents include Fulton et al. U.S. Pat. No. 3,649,246 and Ramachandran's U.S. Pat. Nos. 3,594,155 and 3,666,439. These patents deal only with the problem of increasing the degree to which the injected oxygen reacts with carbon rather than the metal. None are concerned with how one might utilize a diluent to maintain optimum gas flowrate through a supersonic lance while independently controlling cooling of that lance, lance height above the bath, flowrate of oxygen to the process, depth of penetration of the gas jet into the bath, and maximizing life of the lance.

In the use of a supersonic oxygen lance for injection into a steel bath in an electric arc steel making furnace, for example, it is very important to control the gas flowrate within a narrow optimal range that is dictated by the injection nozzle design. This is described in "EAF Optimization: A Review of Maintenance and Operating Practices Leading to Optimum EAF Performance", a short course published by the Iron and Steel Society, Warrendale, Pa., Jun. 19, 2000. Lance operation is also described in "Operation of Subsonic and Supersonic Nozzles", Anatoli Parnas, published by American Combustion Inc., August 1997, as an operating document for use by its customers.

It is often desirable to reduce the rate of oxygen injection to a process for several reasons, including 1) to prevent over heating of the injection lance, 2) to reduce the penetration depth of the oxygen jet into the bath, and 3) to limit the reaction rate of oxygen with a given reactant. In the art, the current method of accomplishing the stated goals is to increase the distance from the tip of the injection lance to the process bath, or to reduce the flowrate of oxygen. Reduction of oxygen flowrate below the optimum range, however, causes loss of cooling and change of exit gas flow patterns near the lance tip. This can damage the lance, causing premature failure. Backing the lance away from the process can reduce the quantity of oxygen that participates in the reaction, and can effect cooling of the lance, but jet penetration is reduced, thereby reducing process efficiency. In addition, oxygen utilization efficiency is also reduced. The object of the present invention is to obviate the stated problems and deficiencies by provision of a means to independently optimize oxygen flowrate and total gas flowrate through the water cooled lance.

BRIEF SUMMARY OF THE INVENTION

An object of the present invention is to provide a method for maximizing the life of a water cooled oxygen injection lance tip used in a metallurgical process. A further object of the invention is to prevent lance tip over heating without reducing the overall gas flowrate through the lance, and without moving the lance away from the process. The required components of the invention are as follows:

1. Metallurgical process reactor that holds the liquid metal bath, and a process of oxygen injection into said metal bath.
2. Water cooled lance for injection of oxygen gas into said liquid metal bath at supersonic speed, and a source of oxygen gas at the required pressure.
3. A second gas to be admixed into the oxygen gas to reduce the oxygen injection rate but not the overall gas injection rate, said second gas selected from the group argon, nitrogen, carbon dioxide, air, and mixtures thereof.
4. Measurement of at least one process variable by which to control the ratio of said oxygen to said admixed second gas, selected from the group: lance height, temperature rise of the lance cooling water, vibration of the water cooled lance, vibration of the metallurgical process reactor, oxygen content of the metal bath, off gas chemistry, off gas temperature, metal oxide content of the slag, process model predictions, or combinations thereof.

The method of this invention is designed to make effective use of available real time and historical information to apply the optimum ratio of oxygen and second gas at all times during the metallurgical operation. The ratio of oxygen to second gas is varied in response to the one or more measured process parameters. The metallurgical process itself may also require less oxygen, so the ratio of oxygen to second gas may be decreased in response to a given process condition, such as the time into the process, or the chemistry of the metal being treated, or the chemistry of the slag. These parameters may be deterimined by prediction based on historical trending or process model, or by process measurement, or a combination thereof. Types of said process measurement may include lance vibration, furnace vibration, furnace offgas temperature measurement, furnace offgas composition measurement, lance height, slag chemistry determination, metal chemistry determination, and the like.

The oxygen pressure causes an indentation or cavity in the liquid metal that it is injected into. The shape and size of this cavity is important to the kinetics and efficiency of metallurgical processes. For a given lance configuration and oxygen jet velocity, pressure and flowrate, there is an optimal distance from the liquid to the lance tip that will cause an optimal indentation or cavity. This said distance may not be optimal for lance tip life. It is an object of the present invention to allow any such distance to be used and concurrently maximize lance tip life by controlling the ratio of oxygen to second gas and maintaining optimal overall flowrate to prevent damage to the lance tip.

BRIEF DESCRIPTION OF THE DRAWINGS

FIG. 1 is a schematic representation of aspects of a system capable of controlling the volume ratio of injected oxygen and second gas into a metallurgical process in accordance with the present invention.

The present invention will be described in connection with a preferred embodiment, however, it will be understood that there is no intent to limit the invention to the embodiment described. On the contrary, the intent is to cover all alternatives, modifications, and equivalents as they may be included within the spirit and scope of the invention as defined by the appended claims.

For a general understanding of the present invention, reference is made to the drawings. In describing the present invention, the following term(s) have been used in the description.

The term "data" includes data existing in any physical form, and includes data that are transitory or are being stored or transmitted. For example, data could exist as electromagnetic or other transmitted signals or as signals stored in electronic, magnetic, or other form.

A "data processor" or "processor" is any component or system that can process data, and may include one or more central processing units or other computers or processing components. A processor performs an operation or a function "automatically" when it performs the operation or function independent of concurrent human control.

The term "liquid metal" refers to any single metal or metal alloy or solution of metallic and other components that forms a substantially metallic liquid phase within the metallurgical process vessel.

A method of processing molten metal by the injection of oxygen through a water cooled supersonic oxygen injection lance and of maintaining constant the optimum total gas flowrate through said lance while concurrently maintaining the optimal oxygen gas flowrate through said lance to the process is made available, comprising the steps of:
 a) Injecting oxygen through said injection lance at an initial flowrate to the process which is the optimal flow rate for the lance tip design,
 b) Continuously measuring at least one process variable related to the required optimal oxygen flowrate to the process and reducing the oxygen flow rate during the process as required, and
 c) Admixing an amount of a second gas flow to said injection lance to maintain the optimal overall gas flow rate for the lance tip design while reducing the oxygen flowrate to the process as required Also, a method is made available to maximize the life of a water cooled lance used for injection of oxygen to a process at supersonic exit velocity while concurrently providing means to vary the rate of oxygen injection through said lance, comprising the steps of:
 a. Maintaining constant the total gas flowrate through said lance in accordance with the lance tip requirements for maximum life
 b. Monitoring at least one process variable to maintain the optimal total gas flowrate through said lance throughout the process
 c. Admixing an amount of a second gas with the oxygen to said lance to reduce oxygen flowrate as required by the process while maintaining constant total gas flowrate as required for maximum service life of said lance tip The method for injection of oxygen and admixed second gas through a water cooled supersonic lance preferably includes the control of the ratio of said gases by a processor that is an integrated control system. The processor receives continuous data (information) regarding one or more parameters of the process related to oxygen injection efficiency and condition of the water cooled lance. In addition, the processor may receive data from Level 2, or from the plant PLC or other source regarding the batch number, grade, charge materials, and the like, concerning and identifying the present batch of liquid metal in the process. The processor in the integrated control system will automatically control the ratio of oxygen to admixed second gas by using the collected data to determine the optimal ratio of said gases.

Referring now to the FIG. 1, liquid metal 22 is disposed within a metallurgical process vessel 28. Processing of the liquid metal 22 requires the injection of oxygen in a supersonic gas jet 18. Metal oxide slag 24 will form on top of liquid metal 22 and may increase in volume as the process progresses. The supersonic gas jet 18 exits through water cooled lance tip 16 attached to water cooled lance body 14. The volumetric flowrate of supersonic gas jet 18 is maintained at the optimal level throughout the processing of the liquid metal 22. The oxygen within supersonic gas jet 18 reacts with the carbon dissolved in liquid metal 22 to form carbon monoxide and carbon dioxide gases which leave the metallurgical process vessel 28 in the off gas stream 20. As the carbon level in the liquid metal 22 continues to drop, the oxygen reacts to a greater extent with the metal components of the liquid metal 22. To minimize such reaction, the oxygen flow rate is decreased and a second gas is is concurrently admixed to maintain the overall gas flow rate at optimal level in accordance with the design of lance tip 16.

Although FIG. 1 depicts a horizontally inserted water cooled lance body 14, those skilled in the art will recognize that the lance is inserted vertically in other metallurgical processes. The present embodiment and invention are equally applicable to a vertically inserted water cooled lance.

The supersonic gas jet 18 causes a cavity 50 to form as it impacts the slag 24 and the liquid metal 22. The optimum flow rate of supersonic gas jet 18 is determined by the design of the lance tip 16. The optimum size and depth of the cavity 50 is determined by the resulting kinetic reaction rate for the given process and the physical constraints of the metallurgical process vessel 28. The distance 44 between the lance tip 16 and the liquid metal 22 surface is varied to provide the optimal size and depth of cavity 50. As the distance 44 is increased, the size and depth of cavity 50 is decreased and vice versa.

The oxygen flowrate to the process may be decreased without changing the overall flow rate of the injected supersonic gas jet 18. The controller 30 determines the optimum level of oxygen flow rate required by the process. Oxygen flows from oxygen source 10 through oxygen supply line 8 into the water cooled lance body 14. Second gas flows from the second gas source 12 through second gas supply line 26 into the water cooled lance body 14 in which it is admixed with said oxygen. Optionally, a mixer may be used to admix the said oxygen with the said second gas prior to entry into the water cooled lance body 14. In either case, the admixture is forced through lance tip 16 under pressure to create the supersonic gas jet 18 that contains the desired ratio of said oxygen to said second gas. Said second gas is chosen from the group nitrogen, argon, air, carbon dioxide, and mixtures thereof.

The controller 30 collects data from the data highway 34 via connection 36. Connection 36 may be Ethernet, optical fiber, or any other communication medium. Process data are collected by field instrumentation. Water from water source 2 is fed through water inlet line 6 into the water cooled lance body 14. Water exits the water cooled lance body 14 through water outlet line 4. Temperature measurement instrument 32 is used to measure the temperature of the water within water outlet line 4 and communicates this data to controller 30. The condition of the lance tip 16 and the impact by the process on its wear is assessed by the controller 30 in part by the data from the temperature measurment instrument 32. Optionally, a vibration measurement instrument 38 is in communication with the water cooled lance body 14 via contact line 46 and thereby measures the vibration of the water cooled lance body 14. The vibration data is communicated to the controller 30. The condition of the lance tip 16 and the optimum level of overall flow rate of supersonic gas jet 18 are determined by the controller in part by the data from the vibration measurement instrument 38. The vibration measurement instrument may use an accelerometer or a laser vibrometer to measure the vibration of the lance 14. (It will be obvious to one skilled in the art that the lance vibration level may also be indirectly measured by measurement of the vibration of any structure that is firmly attached to the water cooled lance body 14, such as a supporting structure or lance carriage.)

Optionally, a vibration measuring instrument 40 is in communication with the metallurgical process vessel 28 via contact line 48 and thereby measures the vibration of the metallurgical process vessel during the process. The vibration data is communicated to the controller 30. The progress of carbon removal by oxygen, as well as other process parameters, may be determined by the controller 30 in part by the vibration data from the vibration measurement instrument 40. The chemistry of the slag 24 may change during the process to become more fluid, causing the slopping of liquid within the metallurgical process vessel 28. Slopping is an undesirable condition that may damage the lance tip 16 and may change the size and depth of the cavity 50. The onset of slopping is determined by the controller 30 by analysis of data from temperature measurement instrument 8 or vibration measurement instrument 40 or vibration measurement instrument 38 or a combination of said instruments. The controller then can determine the new optimum distance 44 and move the water cooled lance body 14 to achieve that distance.

Optionally, the chemistry or temperature of the off gas stream 20 may be determined by field instrument 42. For example, field instrument 42 may be a thermocouple within the off gas stream 20 to measure its temperature. Alternatively, field instrument 42 may be a means to determine the chemistry of the off gas stream 20 such as a solid electrolyte oxygen activity probe or a gas chromatograph. Such measurement is then communicated to controller 30 and the data are used by controller 30 to determine the progress of the metallurgical process, particularly the extent of carbon removal, the oxygen activity, the oxidation rate of liquid metal 22, the efficiency of injected oxygen, and the like. The controller 30 uses these data in part to determine the requirement to reduce oxygen injection to the process, which is accomplished by increasing the ratio of admixed second gas to oxygen within the supersonic gas jet 18.

EXAMPLE 1

A 150 ton batch of steel is melted in an electric arc furnace. A mixture of oxygen and argon is injected through a water cooled copper lance at supersonic exit velocity. The flowrate through the lance is maintained at 1,000 scfm. The oxygen is best utilized at a lance tip to liquid steel distance of 16 inches. The process of melting the steel charge, refining it and tapping it into the receiving ladle takes about 50 minutes. For the first 40 minutes, 100% oxygen and 0% argon is used in the mixture. After 40 minutes, the charge is fully liquid and the iron oxide content of the slag on top of the steel increases to 30%. Concurrently, the temperature rise in the lance cooling water increases by 3 degrees F. At this time, the oxygen flowrate is reduced to 700 scfm and the argon flowrate is increased to 300 scfm, thereby maintaining the overall gas flowrate at 1000 scfm. The cooling water temperature rise decreases by 2 degrees F. in response to the change in oxygen to second gas ratio. The FeO content of the slag is steady at 30%. The carbon content of the steel in the furnace is reduced to 0.04%. At 45 minutes into the process, the oxygen flowrate is further reduced to 400 scfm and the argon flowrate is increased to 600 scfm, thereby maintaining the overall gas flowrate at 1000 scfm. The cooling water temperature rise decreases by 2 degrees F. The FeO content of the slag in the furnace is maintained at 30%. The carbon content in the steel bath is decreased to 0.02%. After 48 minutes the gas flow is shut off, and the steel is discharged from the furnace. The process of varying the ratio of oxygen to second gas to maintain optimal overall gas flowrate and optimal oxygen gas flowrate has improved iron yield, increased oxygen efficiency, and increase lance tip life significantly over the conventional process of electric arc furnace steel making.

EXAMPLE 2

An iron-carbon alloy and steel scrap mixture is charged to a BOF vessel to make a 250 ton batch of steel. Oxygen is injected through a vertically inserted water cooled lance at supersonic speed to remove carbon and make the steel. The desired endpoint carbon is 0.04%. The oxygen is injected through the water cooled copper lance at 22,000 scfm and exits the lance tip at supersonic velocity. The lance tip is held at a distance of 60 inches above the bath which is considered optimal for the required impact cavity size and kinetic progress of the process. As time progresses in the process, an accelerometer indicates that the lance vibration is increasing in intensity. The increase in lance vibration is indicating the approach to the endpoint carbon level, and is accompanied by corresponding increase in oxidation rate of iron from the bath to form iron oxide in the slag. In response to the increase in lance vibration, the controller changes the supersonic gas composition to 50% argon and 50% oxygen while maintaining constant the overall gas flowrate at 22,000 scfm. The efficiency of oxygen for carbon removal is thereby increased, allowing the attainment of the 0.04% endpoint carbon content in the steel with a slag FeO content of only 20%. The lance position and total gas flowrate were kept constant, thereby maintaining the optimal cavity size and depth for the process. The iron yield, lance life, and oxygen efficiency are concurrently all increased respective to the conventional process.

EXAMPLE 3

A 60 ton batch of manganese-carbon alloy is charged to a vessel into which oxygen is injected to remove carbon. The starting carbon content is 7% and the desired endpoint carbon is 1.2%. The oxygen is injected through a water cooled copper lance at 1500 scfm and exits the lance at supersonic velocity. The lance is held at a distance of 35 inches above the bath which is considered optimal for the process. As time progresses and oxygen is injected to remove carbon, the temperature rise of the lance cooling water increases by 3 degrees F. The bath temperature increases by 200 degrees F. At that point, nitrogen is admixed into the oxygen jet in a ratio of 1:1 while maintaining the overall flowrate at 1500 scfm. The lance tip to bath distance is held at the optimal level of 35 inches. The bath temperature increases by 100 degrees F. and the lance cooling water temperature rise holds steady. Once the carbon level in the bath is reduced to 1.2%, the gas flow is shut off. In this manner, the manganese yield, lance life, and oxygen efficiency are concurrently all increased respective to the conventional process.

We claim:

1. A method of processing molten metal in a vessel by the injection of oxygen to a process through a water cooled supersonic horizontally disposed oxygen injection lance into said vessel, and for maintaining constant an optimum total gas flowrate through said lance while concurrently maintaining an oxygen gas flow at an optimal oxygen gas flowrate through said lance into said vessel, said lance comprised of a body and a tip comprising a jet, and said method comprising the steps of:
   (a) first injecting oxygen through said injection lance at said optimum total gas flowrate to said vessel, said optimum total gas flowrate being the optimal total gas flow rate for the particular design of said lance tip,
   (b) continuously measuring at least one process variable related to said optimal oxygen gas flowrate to said vessel,
   (c) reducing said oxygen gas flow as required to maintain said optimal oxygen gas flow rate through said lance during said process,
   (d) supplying and mixing an amount of a second gas at a second gas flow rate with said oxygen gas flow into a mixed gas stream to said horizontally disposed oxygen injection lance, wherein the sum of said optimal oxygen gas flow rate and said second gas flow rate is equal to said optimum total gas flowrate, and
   (e) delivering said mixed gas stream through said body, said tip, and said jet of said horizontally disposed oxygen injection lance into said vessel.

2. The method of claim 1 wherein said second gas is selected from the group nitrogen, argon, carbon dioxide, air, and mixtures thereof.

3. The method of claim 1 wherein the percentage of oxygen by volume of total injected gas flowrate is varied from about 5% to about 100%.

4. The method of claim 1 wherein said at least one process variable is selected from the group: lance height, temperature rise of the lance cooling water, vibration of the water cooled lance, vibration of the metallurgical process reactor, oxygen content of the metal bath, off gas chemistry, off gas temperature, metal oxide content of the slag, process model predictions, or combinations thereof.

5. The method of claim 1 wherein the adjustment of admixture composition, flowrate, and ratio of oxygen and admixture are controlled by an electronic controller in response to said measured process variable.

6. A method of maximizing the life of a water cooled horizontally disposed lance used for injection of oxygen to a process at supersonic exit velocity while concurrently providing means to vary the rate of oxygen injection through said horizontally disposed lance, comprising the steps of:
   (a) maintaining constant the total gas flowrate through said lance in accordance with the lance tip requirements for maximum life;
   (b) monitoring at least one process variable to maintain the optimal total gas flowrate through said horizontally disposed lance throughout said process;
   (c) supplying and mixing an amount of a second gas with said oxygen into a mixed gas stream to said lance to reduce said rate of oxygen injection as required by said process while maintaining constant said total gas flowrate as required for maximum service life of said lance tip; and
   (d) delivering said mixed gas stream through said body, said tip, and said jet of said horizontally disposed lance into said vessel.

7. The method of claim 6 wherein the second gas is selected from the group nitrogen, argon, carbon dioxide, air, and mixtures thereof.

8. The method of claim 6 wherein the percentage of oxygen in the injected gas is varied from about 5% to about 100%.

9. The method of claim 6 wherein said at least one process variable is provided by a thermocouple device used to measure the temperature rise in the lance cooling water and thereby provide the means for monitoring the temperature of the lance tip.

10. The method of claim 6 wherein the adjustment of admixture flowrate and ratio of oxygen to admixture are controlled by an electronic controller in response to at least one measured process variable.

11. The method of claim 10 wherein said measured process variable is selected from the group: lance height, temperature rise of the lance cooling water, vibration of the water cooled lance, vibration of the metallurgical process reactor, oxygen content of the metal bath, off gas chemistry, off gas temperature, metal oxide content of the slag, process model predictions, or combinations thereof.

12. The method of claim 1 wherein said step of delivering said mixed gas stream through said body, said tip, and said jet of said horizontally disposed oxygen injection lance into said vessel comprises delivering said mixed gas stream through said jet at a non-perpendicular angle with respect to said horizontally disposed oxygen injection lance.

13. The method of claim 6 wherein said step of delivering said mixed gas stream through said body, said tip, and said jet of said horizontally disposed lance into said vessel comprises delivering said mixed gas stream through said jet at a non-perpendicular angle with respect to said horizontally disposed lance.

* * * * *